Patented Oct. 8, 1929

1,730,587

UNITED STATES PATENT OFFICE

MARTIN MUGDAN AND JOSEPH WIMMER, OF MUNICH, GERMANY, ASSIGNORS TO CONSORTIUM FUR ELEKTROCHEMISCHE INDUSTRIE, OF MUNICH, GERMANY

PROCESS FOR THE PRODUCTION OF BUTYRIC ALDEHYDE

No Drawing. Application filed March 30, 1927, Serial No. 179,709, and in Germany May 15, 1926.

There are two methods in use for the preparation of normal butyric aldehyde, the dehydration of the corresponding butyl alcohol and the vapor phase hydrogenation of crotonaldehyde. Neither process has led to a satisfactory commercial development.

We have, however, now found a method whereby crotonaldehyde can be converted to butyric aldehyde with good yields. Our process comprises the treatment of heated crotonaldehyde in the liquid phase with hydrogen under pressure in the presence of hydrogenating catalysts. We have found that the speeds of reaction, of crotonaldehyde to butyric aldehyde and of butyric aldehyde to butyl alcohol differ to an unexpected degree in the liquid phase whereas in the vapor phase, as commonly employed, the reaction velocities are only slightly different. This has enabled us to carry on the first reaction in a definitely controlled manner. We have found that the point of complete reaction to butyric aldehyde can be analytically determined before the secondary reaction has started or proceeded to a damaging degree. Such control is impossible in the vapor stage processes. We have found that with a nickel catalyst, for example, if pressures of not over 30 atmospheres are utilized, and the hydrogen treatment is carefully controlled, little or no butyl alcohol is formed. Preferably we utilize pressures of 10-20 atmospheres and a temperature of below 100° C.

Example I

The catalyst consisted of a nickel-kieselguhr mixture containing 15% nickel. This was prepared by precipitation of nickel carbonate or oxide on kieselguhr and reducing with hydrogen.

0.03 kilograms of such a nickel catalyst was added to 1.0 kilograms of dry crotonaldehyde, purified by distillation under vacuum, in an autoclave equipped with an agitator. The suspension was here heated to between 90° C.-100° C. and treated with hydrogen at 10-20 atmospheres pressure with the agitator in operation at 120 R. P. M. Hydrogen was absorbed rapidly at the start; at the end of 4-5 hours the absorption was very slow. The solution now analyzed 65-70% normal butyric aldehyde and about 10% crotonaldehyde; no butyl alcohol was detected. The remainder of the solution was water and condensation products of the butyric aldehyde.

We have found that the amount of condensation products formed depends on the length of the time of reaction; for this reason thorough agitation is advisable. The condensation is also increased by higher temperatures so we prefer to operate below 100° C.

Example II

A suspension of the nickel-kieselguhr catalyst in crotonaldehyde was treated with hydrogen as above at 85° C.-90° C. with the agitator speed at 200 R. P. M. At the end of 2 hours the mixture contained 72% butyric aldehyde, 18% crotonaldehyde, about 7% high boiling condensation products and the remainder water.

Example III

A suspension of 0.03 kilograms of the nickel catalyst in 1 kilogram of crotonaldehyde was placed in an iron cylinder and heated to 90° C. While maintaining a pressure of about 10 atmospheres on the contents, a rapid stream of hydrogen was passed into the mixture in such a way as to allow a slight escape thus giving agitation by the flowing hydrogen. The hydrogen was rapidly absorbed with evolution of heat. At the end of 1½ hours the reaction liquid consisted of 87% butyric aldehyde, 3.0% crotonaldehyde, about 6% high boiling condensation products and the remainder water.

We do not wish to be limited to the specific means or apparatus employed in this reaction since others such as absorption towers can be used.

Claims:

1. Process for the production of butyric aldehyde from crotonaldehyde which comprises treating substantially anhydrous crotonaldehyde in the liquid phase at elevated temperature and pressure with hydrogen in the presence of a hydrogenating catalyst.

2. Process for the production of butyric aldehyde from crotonaldehyde which comprises treating substantially anhydrous crotonaldehyde in the liquid phase, at temperatures up to 100° C., and at elevated pressure, with hydrogen in the presence of a hydrogenating catalyst.

3. Process for the production of butyric aldehyde from crotonaldehyde which comprises treating substantially anhydrous crotonaldehyde in the liquid phase with hydrogen at elevated temperature and pressures up to 30 atmospheres in the presence of a hydrogenating catalyst.

4. Process for the production of butyric aldehyde from crotonaldehyde which comprises treating substantially anhydrous crotonaldehyde in the liquid phase at temperatures up to 100° C. and at elevated pressures up to 30 atmospheres with hydrogen in the presence of a hydrogenating catalyst.

5. Process for the production of butyric aldehyde from crotonaldehyde which comprises treating substantially anhydrous crotonaldehyde in the liquid phase at a temperature between 85° C. and 100° C. with hydrogen at a pressure of between 10 and 20 atmospheres in the presence of a hydrogenating catalyst.

6. Process for the production of butyric aldehyde from crotonaldehyde which comprises treating substantially anhydrous crotonaldehyde in the liquid phase at a temperature between 85° C. and 100° C. with hydrogen at a pressure of between 10 and 20 atmospheres in the presence of a reduced nickel catalyst.

Signed at Munich, in the county of Oberbayern and State of Bavaria, this 9th day of March, A. D. 1927.

MARTIN MUGDAN.
JOSEPH WIMMER.